United States Patent
Kim et al.

(10) Patent No.: US 6,700,739 B2
(45) Date of Patent: Mar. 2, 2004

(54) MAGNETIC HEAD WITH UPPER POLE OF VARYING CROSS-SECTIONAL THICKNESS

(75) Inventors: Yong-su Kim, Seoul (KR); Young-hoon Im, Seoul (KR); Byung-kyu Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 277 days.

(21) Appl. No.: 09/826,367

(22) Filed: Apr. 5, 2001

(65) Prior Publication Data

US 2001/0055181 A1 Dec. 27, 2001

(30) Foreign Application Priority Data

Jun. 22, 2000 (KR) .......................... 2000-34508

(51) Int. Cl.[7] .............................. G11B 5/187; G11B 5/31
(52) U.S. Cl. ........................................... 360/126
(58) Field of Search ........................ 360/122, 125, 360/126

(56) References Cited

U.S. PATENT DOCUMENTS 5,978,187 A * 11/1999 Shouji et al. ............... 360/126
6,108,167 A * 8/2000 Tateyama et al. .......... 360/126
6,169,642 B1 * 1/2001 Mino et al. ................. 360/126
6,252,748 B1 * 6/2001 Yamanaka et al. ......... 360/317

FOREIGN PATENT DOCUMENTS

| JP | A-9-63018 | | 3/1997 |
| JP | 9-237407 A | * | 9/1997 |
| JP | 10-283611 A | * | 10/1998 |
| JP | A-11-45411 | | 2/1999 |
| JP | 2000-48317 A | * | 2/2000 |
| KR | 1998-0081615 | | 11/1998 |

\* cited by examiner

*Primary Examiner*—Jefferson Evans
(74) *Attorney, Agent, or Firm*—Burns, Doane, Swecker & Mathis, LLP

(57) ABSTRACT

A magnetic head including an upper pole and a lower pole for generating a leakage magnetic flux to magnetize a recording medium to have a predetermined pattern, wherein the upper pole has a structure in which the central portion of a side opposite to the recording medium is thicker than the edges of the side. In this magnetic head, the upper pole has a shape in which its central portion protrudes higher than its edges. Thus, the shape of a magnetic field distributed can be maintained rectangular even if the width of the upper pole is reduced, which enables an increase in the track density of a recording medium.

8 Claims, 5 Drawing Sheets

MAGNETIC HEAD WITH UPPER POLE OF VARYING CROSS-SECTIONAL THICKNESS

BACKGROUND OF THE INVENTION

1. Field of the Invention

The present invention relates to a magnetic head for recording a magnetic signal in a recording medium and reproducing the same therefrom, and more particularly, to a magnetic head having an improved upper pole for recording a magnetic signal.

2. Description of the Related Art

Apparatuses for recording and reproducing a magnetic signal in and from a predetermined recording medium, such as, hard disk drives, have a magnetic head for performing recording and reproduction. As shown in FIG. 1, a magnetic head 10 is installed in a slider 20 installed on one end of a swing arm 30, and moves to a desired track position over a recording medium (not shown) by pivoting of the swing arm 30 to perform recording or reproduction.

FIG. 2 is a magnified perspective view of the magnetic head 10. As shown In FIG. 2, the magnetic head 10 includes a magneto resistive head 14 for reproduction and an induction recording head for recording. The magneto resistive head 14 detects and reads a magnetic signal from a recording medium. The induction recording head includes an upper pole 11 and a lower pole 12 for forming a leakage magnetic flux and a recording coil 13, which is a current supply route, to record a magnetic signal of a desired content in a recording medium.

In particular, the induction recording head determines the quality of a signal input to a recording medium. Accordingly, if the input via the induction recording head is not clean, the magneto resistive head 14 cannot perform satisfactory reproduction even if it has an excellent performance.

In recent trends, recording mediums reduce the width of tracks to which a magnetic signal is input, in order to increase their storage capacity. When the width of tracks is reduced, the width w of the upper pole 11 of the induction recording head which receives a magnetic signal must also be reduced in conformity to the reduced width of tracks. However, the reduction of the width w of the upper pole 11 increases the edge effect of a magnetic field generated by the induction recording head, so that the vertical component of the magnetic field is measured as having a pattern in which it is concentrated at the edges of the upper pole, as shown in FIG. 3. When a magnetic signal is recorded on the recording medium in this state, the shape of magnetized areas on the recording medium representing recorded data is apt to a horse shoe as shown in FIG. 4. This horse shoe shape denotes unclear and unclean recording of a magnetic signal on a track. Thus, clean input of a magnetic signal is achieved by improving the seagull shape of magnetization to a rectangular shape. Therefore, a magnetic head capable of maintaining the magnetization shape rectangular even when the track width is reduced is required.

SUMMARY OF THE INVENTION

To solve the above problem, an objective of the present invention is to provide an improved magnetic head by which the shape of magnetized areas on a recording medium representing recorded data is maintained rectangular even when the width of the tracks of the recording medium is reduced.

To achieve the above objective, the present invention provides a magnetic head including an upper pole and a lower pole for generating a leakage magnetic flux to magnetize a recording medium to have a predetermined pattern, wherein the upper pole has a [structure] pentagonal cross-section in which the central portion of a side opposite to the recording medium is thicker than the edges of the side.

To achieve the above objective, the present invention provides a magnetic head having an upper pole and a lower pole for generating a magnetic flux to magnetize a recording medium to have a predetermined pattern. The upper pole has a bottom surface designed to be adjacent to a recording medium, two side surfaces and a top surface. The top surface extends between edges of the side surfaces without extending over the side surfaces, wherein a thickness of the upper pole measured from the top surface to the bottom surface is greater at a central location than at the edges of the side surfaces.

BRIEF DESCRIPTION OF THE DRAWINGS

The above objective and advantage of the present invention will become more apparent by describing in detail preferred embodiments thereof with reference to the attached drawings in which.

DESCRIPTION OF THE PREFERRED EMBODIMENTS

Figure 1:
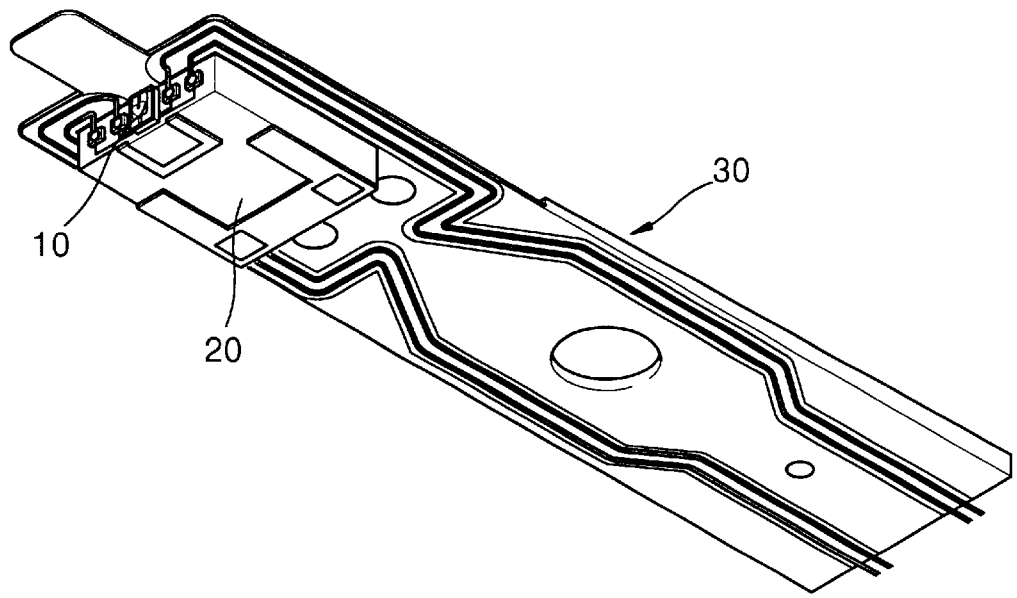
FIG. 1 is a perspective view illustrating the installation location of a general magnetic head.
Figure 2:
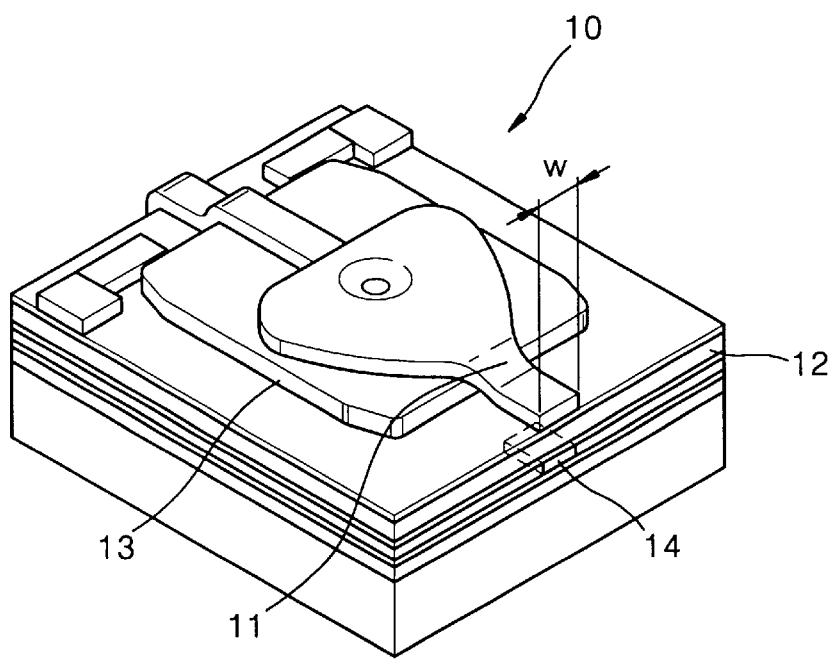
FIG. 2 is a perspective view of an existing magnetic head.
Figure 3:
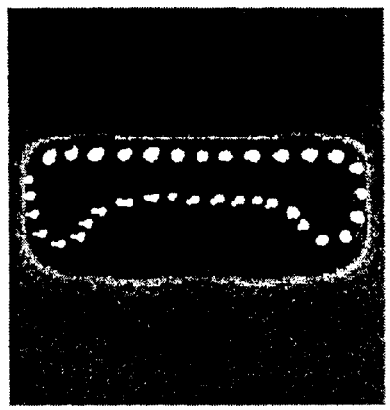
FIG. 3 is a distribution view of a magnetic field distributed by the magnetic head of FIG. 2.
Figure 4:
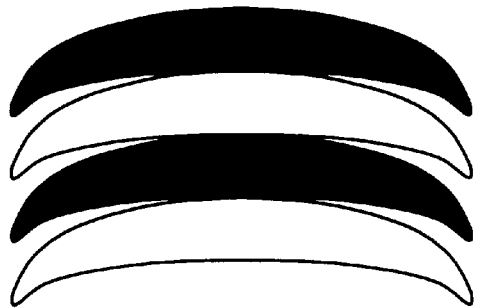
FIG. 4 illustrates a magnetization pattern recorded in a recording medium by means of the magnetic head of FIG. 2.
Figure 5A:
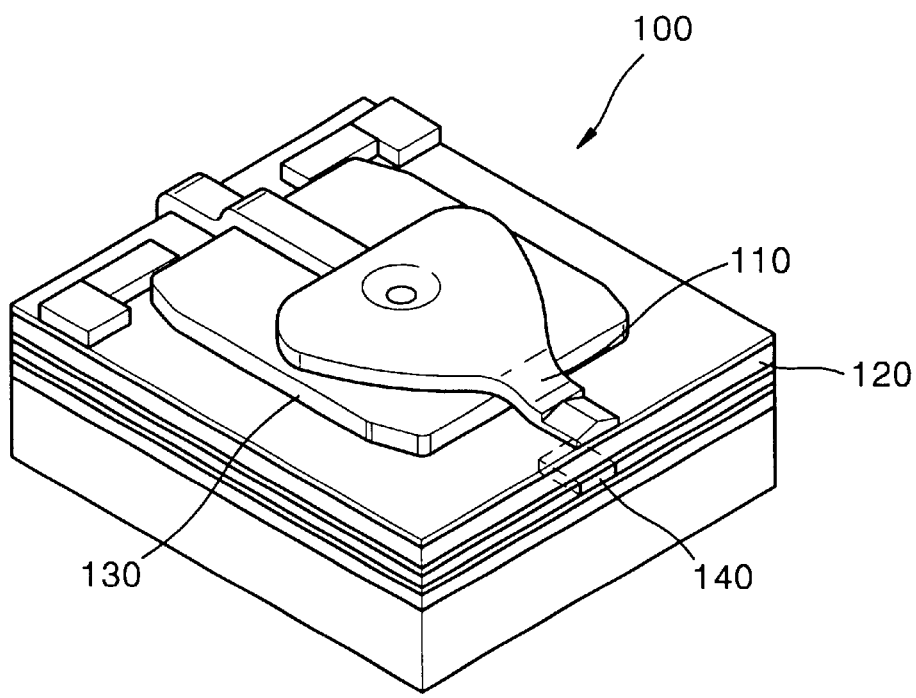
FIGS. 5A and 5B show the structure of a magnetic head according to an embodiment of the present invention.
Figure 5B:
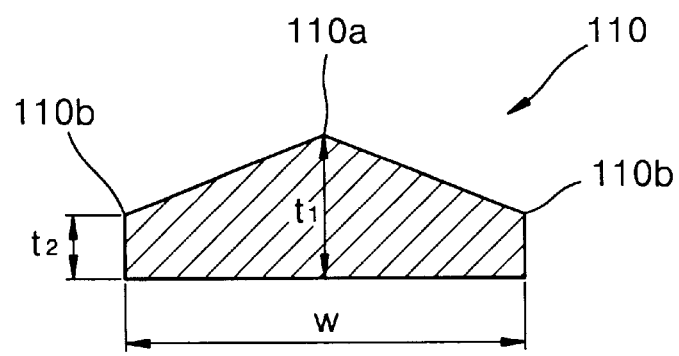

Referring to FIGS. 5A and 5B, a magnetic head 100 according to an embodiment of the present invention includes a magneto resistive head 140 for reproduction and an inductive recording head for recording. The inductive recording head includes an upper pole 110 and a lower pole 120 for forming a leakage magnetic flux and a recording coil 130, which is a current supply route.

Figure 6:
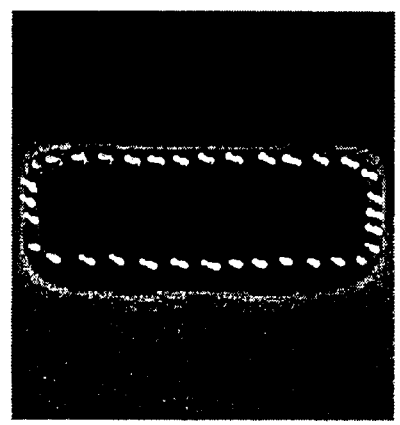
FIG. 6 is a distribution view of a magnetic field distributed by a magnetic head according to the present invention.

In this embodiment, the cross-section of the upper pole 110 at the side opposite to a recording medium is pentagonal, so that the thickness t1 of a central portion 110a is greater than the thickness t2 of an edge portion 110b. That is, if the central portion protrudes by being thickened more than the edges, a similar edge effect to that at the two edges 110b occurs at the protruding central portion. Consequently, as shown in FIG. 6, the distribution of the vertical field of a magnetic field is shaped of a rectangle in which the vertical field spreads almost equally at the central portion of the upper pole and at the edges thereof.

Figure 7:
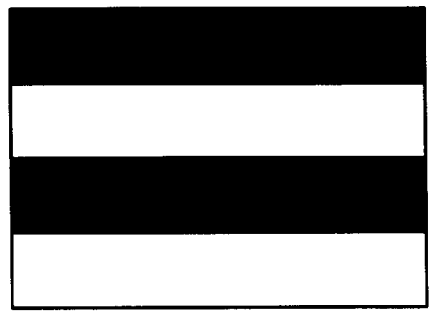
FIG. 7 illustrates a magnetization pattern recorded in a recording medium by means of a magnetic head according to the present invention.

Accordingly, if the central portion 110a of the upper pole 110 protrudes higher than the edge portions 110b, the shape of a magnetic field distributed is maintained rectangular even if the width w of the upper pole 110 is reduced in conformity to the width of the tracks of a recording medium. Thus, a signal can also be recorded while maintaining a clean magnetization shape as shown in FIG. 7, so that the track density of a recording medium can be increased without anxiety.

Figure 8:
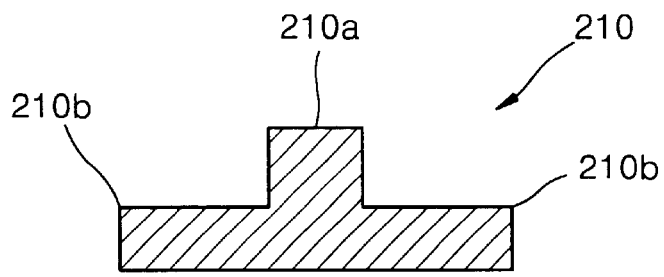
FIGS. 8 through 10 are cross-sections of magnetic heads according to the other embodiments of the present invention.
Figure 9:
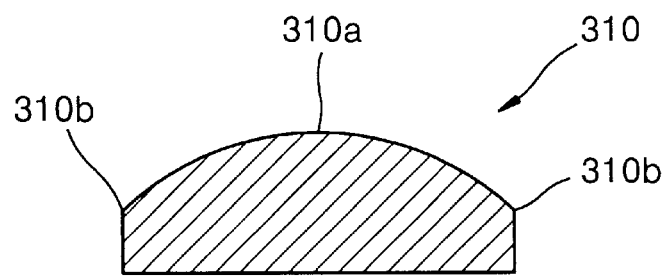
Figure 10:
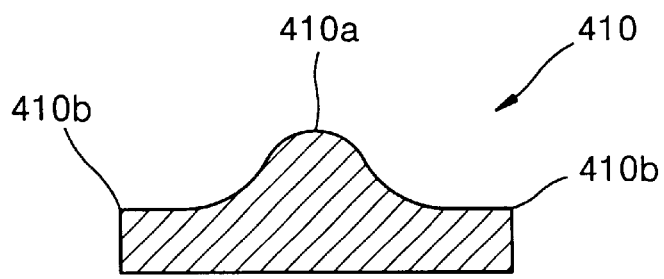

A magnetic head according to the present invention can be transformed into various embodiments as shown in FIGS. 8 through 10.

That is, in all cases of an upper pole 210 having an upsidedown T-shaped cross-section of FIG. 8, an upper pole 310 having a convex cross-section of FIG. 9 and an upper pole 410 having an uplifted cross-section of FIG. 10, central portions 210a, 310a and 410a protrude higher than edges 210b, 310b and 410b, respectively, to become thicker than the edges 210b, 310b and 410b, respectively. In the cases of these protruding central portions 210a, 310a and 410a, the shape of a magnetic field distributed is maintained rectangular, as shown in FIG. 6, due to the decentralization of the edge effect.

Hence, if the central portion of an upper pole protrudes by increasing its thickness to be greater than the thickness of edges even if the upper pole has any shapes, the distribution of a magnetic field can continuously have a rectangular shape. Undoubtedly, the difference in thickness between the central portion and the edges, which is the most suitable to maintain the distribution of a magnetic field in a rectangular shape, can be drawn by an experiment. The optimal difference in thickness according to the shape of an upper pole can be set through the repetition of the manufacture of an upper pole and the measurement of the distribution of a magnetic field.

In a magnetic head according to the present invention, as described above, an upper pole has a shape in which its central portion protrudes higher than its edges. Thus, the shape of a magnetic field distributed can be maintained rectangular even if the width of the upper pole is reduced, which enables an increase in the track density of a recording medium.

What is claimed is:

1. A magnetic head including an upper pole and a lower pole for generating a leakage magnetic flux to magnetize a recording medium to have a predetermined pattern, wherein the upper pole has a pentagonal cross-section in which the central portion of a side opposite to the recording medium is thicker than the edges of the side.

2. A magnetic head comprising:

an upper pole; and a lower pole for generating a magnetic flux to magnetize a recording medium to have a predetermined pattern, wherein the upper pole has a bottom surface, two side surfaces and a top surface extending between edges of the side surfaces without extending over the side surfaces, wherein a thickness of the upper pole measured from the top surface to the bottom surface is greater at a central location than at the edges of the side surfaces, wherein the upper pole has a pentagonal cross-section.

3. A magnetic head comprising:

an upper pole; and a lower pole for generating a magnetic flux to magnetize a recording medium to have a predetermined pattern, wherein the upper pole has a bottom surface, two side surfaces and a top surface extending between edges of the side surfaces without extending over the side surfaces, wherein a thickness of the upper pole measured from the top surface to the bottom surface is greater at a central location than at the edges of the side surfaces, wherein the upper pole has an inverted T-shaped cross-section, wherein the top part of the T-shape constitutes the bottom surface of the upper pole.

4. A magnetic head comprising:

an upper pole; and a lower pole for generating a magnetic flux to magnetize a recording medium to have a predetermined pattern, wherein the upper pole has a bottom surface, two side surfaces and a top surface extending between edges of the side surfaces without extending over the side surfaces, wherein a thickness of the upper pole measured from the top surface to the bottom surface is greater at a central location than at the edges of the side surfaces, wherein the bottom surface is planar.

5. The magnetic head of claim 4, wherein the upper pole has a pentagonal cross-section.

6. The magnetic head of claim 4, wherein the upper pole has an inverted T-shaped cross-section, wherein the top part of the T-shape constitutes the bottom surface of the upper pole.

7. The magnetic head of claim 4, wherein the top surface of the upper pole is a convex surface.

8. The magnetic head of claim 4, wherein the top surface of the upper pole has a symmetric curved surface.

* * * * *

UNITED STATES PATENT AND TRADEMARK OFFICE
CERTIFICATE OF CORRECTION

PATENT NO.    : 6,700,739 B2                                          Page 1 of 1
DATED         : March 2, 2004
INVENTOR(S)   : Yong-su Kim et al.

It is certified that error appears in the above-identified patent and that said Letters Patent is hereby corrected as shown below:

<u>Title page,</u>
Item [75], Inventors:     Yong-su Kim
                          Young-hoon Im
                          Byung-kyu Lee to read:
                          Yong-su Kim
                          Young-hun Im
                          Byung-kyu Lee

Signed and Sealed this

Seventh Day of September, 2004

JON W. DUDAS
*Director of the United States Patent and Trademark Office*